(12) United States Patent
Cieslak et al.

(10) Patent No.: US 11,275,623 B1
(45) Date of Patent: Mar. 15, 2022

(54) CORE TARGETING IN HETEROGENEOUS MULTIPROCESSOR SYSTEMS

(71) Applicants: Michael Cieslak, Los Angeles, CA (US); Jiayao Yu, Venice, CA (US); Kai Chen, Manhattan Beach, CA (US); Farnaz Azmoodeh, Venice, CA (US); Michael David Marr, Monroe, WA (US); Jun Huang, Beverly Hills, CA (US); Zahra Ferdowsi, Marina del Rey, CA (US)

(72) Inventors: Michael Cieslak, Los Angeles, CA (US); Jiayao Yu, Venice, CA (US); Kai Chen, Manhattan Beach, CA (US); Farnaz Azmoodeh, Venice, CA (US); Michael David Marr, Monroe, WA (US); Jun Huang, Beverly Hills, CA (US); Zahra Ferdowsi, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 257 days.

(21) Appl. No.: 16/427,285

(22) Filed: May 30, 2019

(51) Int. Cl.
*G06F 9/50* (2006.01)
*G06F 11/34* (2006.01)
*G06F 11/30* (2006.01)

(52) U.S. Cl.
CPC ............ *G06F 9/505* (2013.01); *G06F 9/5094* (2013.01); *G06F 11/3024* (2013.01); *G06F 11/3433* (2013.01); *G06F 2209/501* (2013.01); *G06F 2209/508* (2013.01)

(58) Field of Classification Search
None
See application file for complete search history.

(56) References Cited

U.S. PATENT DOCUMENTS

| 2010/0153956 A1* | 6/2010 | Capps, Jr | G06F 9/5044 718/102 |
| 2011/0161586 A1* | 6/2011 | Potkonjak | G06F 12/084 711/122 |
| 2018/0260360 A1* | 9/2018 | Samadi | G06F 12/0875 |

OTHER PUBLICATIONS

Greenhalgh, "Big.LITTLE Processing with ARM Cortex-AI 5 & Cortex-A7"; ARM Limited Whitepaper; Sep. 2011, 8 pages (Year: 2011).*

* cited by examiner

*Primary Examiner* — Eric C Wai
(74) *Attorney, Agent, or Firm* — Culhane Meadows PLLC; Stephen J. Weed (57) ABSTRACT

Systems, devices, media, and methods are presented for throttling (i.e., adjusting) the workload of an application (e.g., number of task requests) in order to improve processor core usage within a heterogeneous multiprocessor system. When high-performance processing is beneficial to the application, the number of task requests may be increased in order to have high-performance processor cores within the heterogeneous multiprocessor system core processor perform the tasks. On the other hand, when high-performance processing is not beneficial, the number of task requests may be decreased in order to have low-performance processor cores within the heterogeneous multiprocessor system perform the tasks. Processor core usage is monitored, and the number of tasks being performed are adjusted to match the processor core usage to a target processor core usage for functions the application is performing.

20 Claims, 8 Drawing Sheets

CORE TARGETING IN HETEROGENEOUS MULTIPROCESSOR SYSTEMS

TECHNICAL FIELD

Examples set forth in this disclosure relate generally to applications running on client devices. More particularly, but not by way of limitation, this disclosure addresses systems and methods for targeting which cores in a heterogeneous multiprocessor system are performing tasks of an application, e.g., to limit how much work the application performs to ensure power efficiency for the users of the application.

BACKGROUND

Heterogeneous multiprocessor systems are processor systems that include at least two different types of processor cores. For example, a heterogeneous multiprocessor system may include two cores having relatively high-performance characteristics for use when intensive processing tasks are being performed and two cores having relatively low-performance characteristics for use when non-intensive processing is being performed.

BRIEF DESCRIPTION OF THE DRAWINGS

The disclosed subject matter is best understood from the following detailed description when read in connection with the accompanying drawings, with like elements having the same reference numerals. When a plurality of similar elements is present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION

Aspects of the subject matter disclosed herein are directed to systems/applications for throttling (i.e., adjusting) the workload of an application (e.g., number/rate of task requests) in order to improve processor core usage within a heterogeneous multiprocessor system. For example, when high-performance processing is beneficial to the application, the system/application may increase the number of task requests in order to have high-performance cores within the heterogeneous multiprocessor system perform those tasks. On the other hand, when high-performance processing is not beneficial, the system may reduce/limit the number of task requests in order to have low-performance cores within the heterogeneous multiprocessor system perform the tasks. As used herein, the term heterogeneous multiprocessor system is meant to include a multi-core processor, system on a chip (SoC) that has multiple processing cores, or other type of device having multiple processing cores including multiple types of processors/cores (e.g., processors/cores that are not symmetric and/or have different processing capabilities) or including processors/cores of the same type than can be adjusted up and down in terms of processing performance/throughput using dynamic frequency scaling (e.g., as a function of clock frequency of the processors/cores).

The application/system may monitor current processor core usage and adjust the number of tasks being performed to match the processor core usage to a target processor core usage for functions the application/system is performing in order to, for example, conserve power or improve speed. In one example, the application/system reduces the number of tasks being performed for an application when speed is not beneficial (e.g., when a user is viewing text) in order to influence the heterogeneous multiprocessor system to use a relatively low-performance core(s) in order to conserve battery power, and increase the number of tasks being performed when speed is beneficial (e.g., during real-time processing of video) in order to influence the heterogeneous multiprocessor system to use a relatively high-performance core(s) in order to improve speed.

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

In accordance with one example, a method is provided for influencing processor core usage in a heterogeneous multiprocessor system of a device. The method includes determining a workload type for an application running on the heterogeneous multiprocessor system of the device, monitoring the heterogeneous multiprocessor system core usage to identify a first subset of one or more cores within the heterogeneous multiprocessor system performing the workload type, identifying a target core usage for the workload type, the target core usage including a second subset of one or more cores within the heterogeneous multiprocessor system, and adjusting a workload of the application to match the first subset of one or more cores to the second subset of one or more cores.

In accordance with another example, a system is provided for influencing processor core usage in a heterogeneous multiprocessor system of a device. The system includes a memory that stores instructions for execution by the heterogeneous multiprocessor system. The instructions configure the heterogeneous multiprocessor system to determine a workload type for an application running on the heterogeneous multiprocessor system of the device, monitor the heterogeneous multiprocessor system core usage to identify a first subset of one or more cores within the heterogeneous multiprocessor system performing the workload type, identify a target core usage for the workload type, the target core usage including a second subset of one or more cores within the heterogeneous multiprocessor system, and adjust a workload of the application to match the first subset of one or more cores to the second subset of one or more cores.

In accordance with another example, a non-transitory processor-readable storage medium is provided that stores processor-executable instructions for influencing processor core usage in a heterogeneous multiprocessor system of a device that, when executed by a processor of a machine, cause the machine to perform operations. The operations performed by the machine include determining a workload type for an application running on the heterogeneous multiprocessor system of the device, monitoring the heterogeneous multiprocessor system core usage to identify a first subset of one or more cores within the heterogeneous multiprocessor system performing the workload type, identifying a target core usage for the workload type, the target core usage including a second subset of one or more cores within the heterogeneous multiprocessor system, and adjusting a workload of the application to match the first subset of one or more cores to the second subset of one or more cores.

Figure 1:
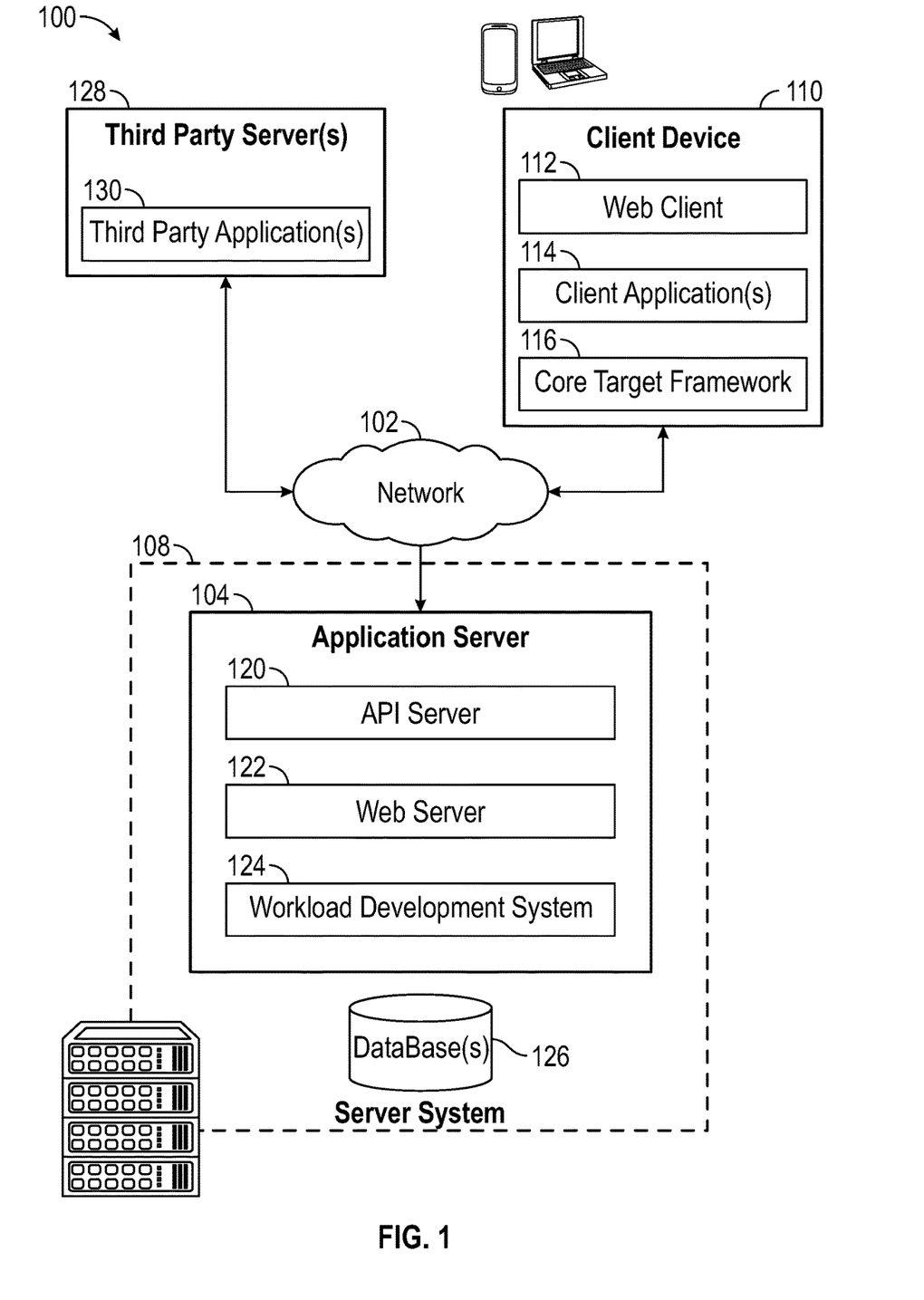
FIG. 1 is a block diagram of an example processor core targeting system in an online client-server system.

FIG. 1 is a block diagram illustrating a system 100, according to some examples, configured to influence processor core usage in heterogeneous multiprocessor system devices. The system 100 includes one or more client devices such as client device 110. The client device 110 includes, but is not limited to, a mobile phone, desktop computer, laptop, portable digital assistants (PDA), smart phone, tablet, netbook, laptop, multi-processor system, microprocessor-based or programmable consumer electronic, game console, set-top box, computer in a vehicle, or any other communication device that a user may utilize to access the system 100. In some examples, the client device 110 includes a display module (not shown) to display information (e.g., in the form of user interfaces). In further examples, the client device 110 includes one or more of touch screens, accelerometers, gyroscopes, cameras, microphones, global positioning system (GPS) devices, and so forth. The client device 110 may be a device of a user that is used to access and utilize an online social platform. For example, the client device 110 may be used to input information to create an account, exchange information over a network 102, and so forth.

For example, client device 110 may be a device of a user who is using a social media application on the device. Client device 110 may call a server for a social platform (e.g., hosted by server system 108) via the social media application directly or through one or more third-party servers 128 (e.g., utilizing one or more third-party applications 130). Application server 104 tracks information regarding client device (e.g., make, model number, central processing unit (CPU) type, graphics processing unit (GPU) type, associated performance metrics, etc.) as a dataset in database 126.

One or more users may be a person, a machine, or other means of interacting with the client device 110. In examples, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via the network 102. In this instance, the other entities in the system 100, in response to receiving the input from the user, may communicate information to the client device 110 via the network 102 to be presented to the user. In this way, the user interacts with the various entities in the system 100 using the client device 110.

The system 100 further includes a network 102. One or more portions of the network 102 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, another type of network, or a combination of two or more such networks.

The client device 110 may access the various data and applications provided by other entities in the system 100 via web client 112 (e.g., a browser) and/or one or more client applications 114. The client device 110 may include one or more client application(s) 114 (also referred to as "apps") such as, but not limited to, a processor core targeting application, a web browser, messaging application, electronic mail (email) application, an e-commerce site application, a mapping or location application, and the like. The client device 110 may additionally include a core target framework 116 that monitors which processor cores of a heterogeneous multiprocessor system within the client device 110 are in use and adjusts task requests for functions being performed by the client device 110 to influence which cores are performing the functions.

In some examples, one or more client application(s) 114 are included in a given one of the client device 110, and configured to locally provide the user interface and at least some of the functionalities, with the client application(s) 114 configured to communicate with other entities in the system 100 (e.g., third-party server(s) 128, server system 108, etc.), on an as-needed basis, for data processing capabilities not locally available (e.g., to access location information, to authenticate a user, etc.). Conversely, one or more client application(s) 114 may not be included in the client device 110, and then the client device 110 may use its web browser to access the one or more applications hosted on other entities in the system 100 (e.g., third-party server(s) 128, server system 108, etc.).

A server system 108 provides server-side functionality via the network 102 (e.g., the Internet or wide area network (WAN)) to one or more third party server(s) 128, and one or more client devices 110. The server system 108 includes an application program interface (API) server 120, a web server 122, and a workload development system 124 (e.g., for developing core targeting applications for use by client device 110), that may be communicatively coupled with one or more database(s) 126. The one or more database(s) 126 may be storage devices that store data (e.g., in a dataset) related to users of the server system 108, applications associated with the server system 108, cloud services, and so forth. The one or more database(s) 126 may further store information related to third party server(s) 128, third-party application(s) 130, client device 110, client application(s) 114, users, and so forth. In one example, the one or more database(s) 126 may be cloud-based storage.

The server system 108 may be a cloud computing environment, according to some examples. The server system 108, and any servers associated with the server system 108, may be associated with a cloud-based application. In one example the server system 108 includes a workload development system 124. The workload development system 124 may include one or more servers and may be associated with a cloud-based application. The workload development system 124 may develop and distribute core targeting applications (e.g., as part of a social media application or update thereto) to client devices 110.

The system 100 further includes one or more third-party server(s) 128. The one or more third-party server(s) 128 may include one or more third-party application(s) 130. The one or more third-party application(s) 130, executing on third party server(s) 128 may interact with the server system 108 via API server 120 via a programmatic interface provided by the API server 120. For example, one or more of the third-party applications 130 may request and utilize information from the server system 108 via the API server 120 to support one or more features or functions on a website hosted by the third party or an application hosted by the third party.

Figure 2:
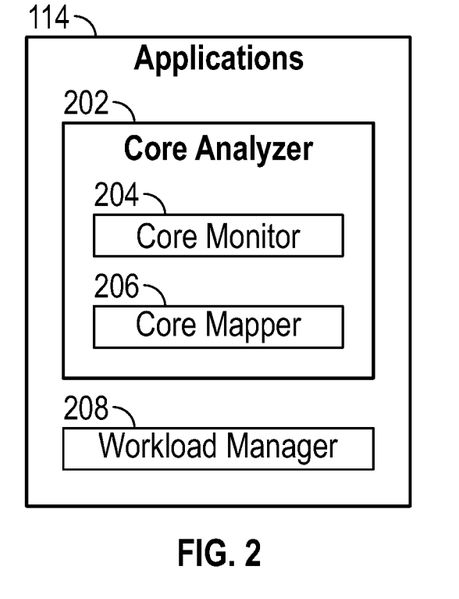
FIG. 2 is a block diagram illustrating an example application for processor core targeting in a device.

FIG. 2 is a block diagram illustrating example client applications 114 including a core analyzer 202 and a workload manager 208. The illustrated core analyzer 202 includes a core monitor 204 and a core mapper 206. Other suitable applications for use in client device 110 will be understood from the description herein.

Figure 3:
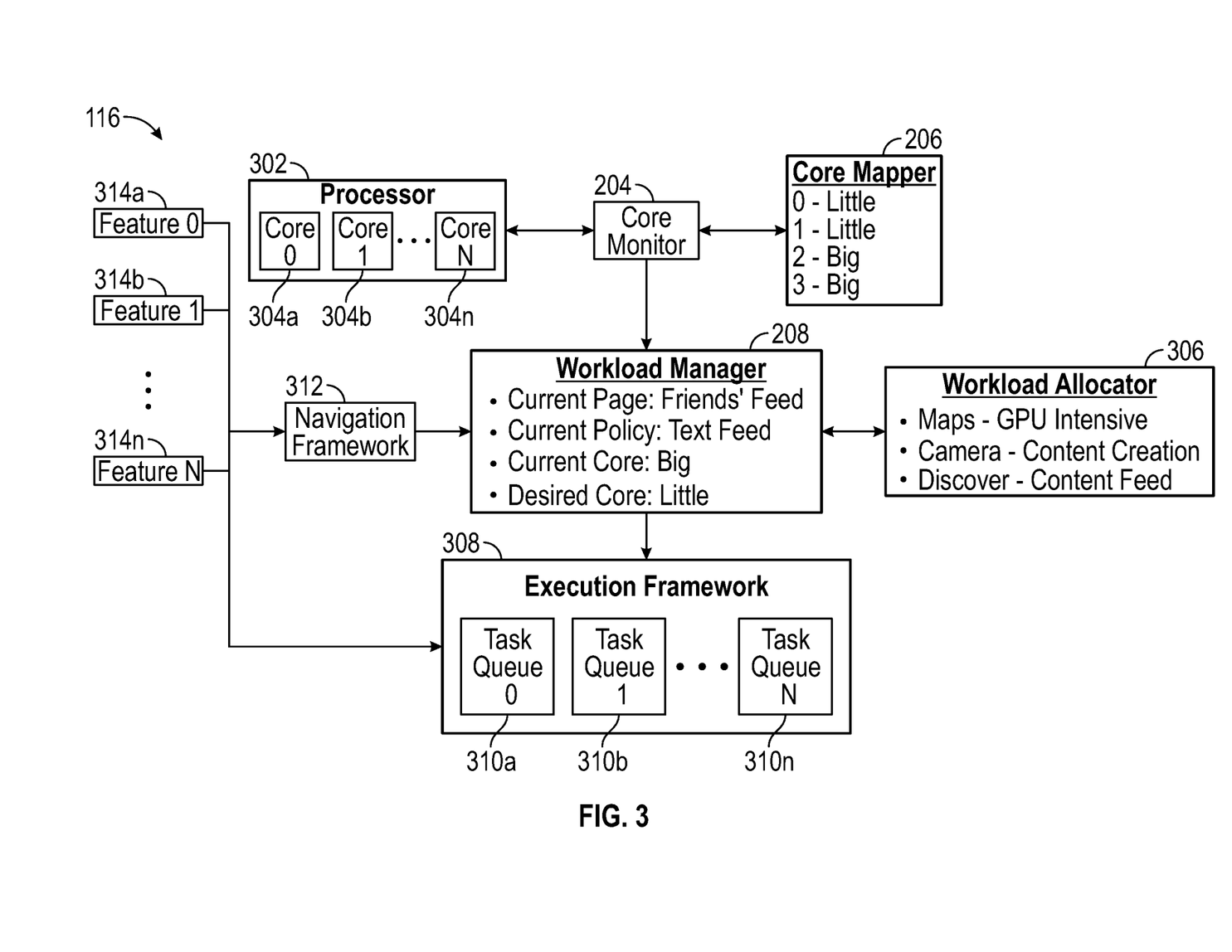
FIG. 3 is a block diagram illustrating a core target framework including applications and components for implementing processor core targeting.

The core monitor 204 configures the client device 110 to monitor aspects of a heterogeneous multiprocessor system (see, for example, processor 302 depicted in FIG. 3 and the related description). Aspects of the heterogeneous multiprocessor system may include processor core statistics such as frequency range and/or cache size of each core within the heterogeneous multiprocessor system.

From the processor core statistics, the core mapper 206 determines a processor core type (e.g., high-performance/big or low-performance/little) for each processor core within the heterogeneous multiprocessor system. In one example, the core mapper 206 determines if a processor core has a relatively high level of processing capability (i.e., a "big" processor core type) or a relatively low level of processing capability (i.e., a "little" processor core type). In another example, the core mapper 206 determines if a processor core is capable of operating at two different levels of performance (e.g., a relatively high level/"big" processor core type associated with a relatively high core clock frequency and a relatively low level/"little" processor core type associated with a relatively low core clock frequency. The core mapper 206 stores the determined type of each processor core (e.g., in a look-up table in memory).

The workload manager 208 communicates with the core analyzer 202 to determine which processor cores are currently in use (e.g., big or little). The workload manager 208 additionally monitors features of an application running on the device 110 and controls application tasks to influence which processor cores are performing the features in order to improve one or more operational characteristics of the device 110 (e.g., power use or speed).

FIG. 3 depicts an example core target framework 116 for influencing processor core usage. The illustrated system 116 includes a heterogeneous multiprocessor system 302. The heterogeneous multiprocessor system 302 includes a plurality of processor cores 304a-n. The heterogeneous multiprocessor system 302 includes at least two types of processor cores or processor cores capable of operating at two different capability levels. In an example, cores 0 and 1 304a and 304b may be relatively low-performance cores and the remaining cores may be relatively high-performance cores. In another example, cores 0-N may be capable of operating at different levels of performance. The heterogeneous multiprocessor system 302 may determine which processor cores to use based on tasks it receives from applications running on the device 110. An example of a heterogeneous multiprocessor system is the Qualcomm Snapdragon 845. System on a Chip (SoC), used in the Samsung Galaxy S8 available from Samsung of Seoul, South Korea (which includes a 2.35-2.45 GHz Quad-core Kryo having 4 "big" processor cores and a 1.8-1.9 GHz Quad-core Kryo having 4 "little" processor cores). Although heterogeneous multiprocessor systems with two types of processor cores are described herein, the present disclosure is applicable to heterogeneous multiprocessor systems with additional types of cores, e.g., cores capable of operating a different level of performance.

The core monitor 204 is in communication with the heterogeneous multiprocessor system 302 and core mapper 206. The core monitor 204 is configured to monitor characteristics of the processor cores 304 and report the monitored characteristics (e.g., cache size and/or frequency range) to the core mapper 206. The core monitor 204 may poll a central processing unit (CPU) statistics directory (e.g., maintained in and/or by processor 302) to retrieve frequency range (roughly the number of calculations executed by the processor core per second) and/or cache size for each processor core. The frequency range and/or cache size for each processor core may be stored in the CPU statistics directory by a Linux kernel running on the heterogeneous multiprocessor system 302. The frequency rage and/or cache size may be determined for a particular mobile device or a particular heterogeneous multiprocessor system and communicated by the core monitor 204 to a server (e.g., server system 108) for storage and subsequent configuration of other device of the same or similar type or having the same or similar heterogeneous multiprocessor system.

The core mapper 206 determines the processor core type of each processor core 304 based on the characteristics from the core monitor 204 and stores the determined type in memory (e.g., in a look-up table). The core mapper 206 may compare one or more of the characteristics to known values (e.g., frequency range and/or cache size) indicative of a particular type of processor core. For example, in a four-core (quad-core) processor 302, two of the processor cores 304 (e.g., processor core 0 and processor core 1) may be relatively low-performance processor cores with a relatively low frequency range and/or small amount of cache and two of the processor cores 304 (e.g., core 2 and core 3) may be relatively high-performance processor cores with a relatively high frequency range and/or large amount of cache. By comparing the frequency ranges and/or cache values of the processor cores to known frequency ranges and/or cache values (single values or ranges of value) for the types of processor cores being monitored, the core mapper 206 can map each processor core to a particular processor core type. The core mapper 206 stores the processor core type. Additionally, or alternatively, the core mapper 206 may communicate the processor core type to a server (e.g., server system 108) for storage and subsequent configuration of other device of the same or similar type or having the same or similar heterogeneous multiprocessor system.

The core monitor 204 is additionally configured to determine which type of processor core is currently in use by processor 302. The core monitor 204 may retrieve current processor core statistics and determine which type of processor core is in use by comparing the processor core statistics for each of the processor cores to known values for high-level processor cores and low-level processor cores to identify a match. The core monitor 204 can then assign a processor core type to each of the processor cores of the heterogeneous multiprocessor system responsive to the identified match for storage by core mapper 206.

The core monitor 204 is additionally configured to monitor which processor core type is currently in use (e.g., little processor cores 0/1 or big processor cores 2/3). The core monitor 204 may periodically poll threads running by the processor 302 to determine which processor core 304 is processing that thread. Using processor core type information retrieved from the core mapper 206, the core monitor 204 determines the particular type of processor core that processed the thread and reports that information to a workload manager 208.

The workload manager 208 monitors the currently running features of an application (e.g., a social media application) and influences which processor cores are executing instructions for those offerings, e.g., to improve battery life without negatively impacting a user's experience with the application. The illustrated workload manager 208 maintains a table including information regarding current aspects of the application, a policy associated with the current aspects of the application, information regarding the current processor core(s) 304 in use, and information regarding the desired processor core(s) 304 to use.

If there is a discrepancy between the processor core(s) 304 in use and the desired processor core(s) 304, the workload manager 208 will change (throttle) performance of task being assigned by the application to the task queues (task queues 310a-n) within the execution framework 308. For example, if the current processor core(s) 304 in use are relatively high-performance processor cores ("Big") and the desired processor core(s) 304 are relatively low-performance processor core(s) 304 ("Little"), the workload manager will reduce the number/rate of tasks being assigned to the task queues 310 in order to have the heterogeneous multiprocessor system 302 move processing to the relatively low-performance processor core(s) 304. On the other hand, if the current processor core(s) 304 in use are relatively low-performance processor cores ("Little") and the desired core(s) 304 are relatively high-performance processor core(s) 304 ("Big"), the workload manager 208 will increase the number/rate of tasks being assigned to the task queues 310 in order to have the heterogeneous multiprocessor system 302 move processing to the relatively high-performance processor core(s) 304 or change the performance level of a processor (e.g., by adjusting its clock frequency).

The illustrated workload manager 208 determines the current feature offerings of an application and policies associated with those feature offerings based on a navigation framework 312 that monitors features (e.g., features 314a-314n) of an application. For example, Feature 0 314a may be an information feed received from a friend of a user of a social media application. The navigation framework 312 may determine current feature offering (e.g., a current "page" of the social media application) and a currently policy (text feed) based on one or more of the Features 314 currently being provided by the social media application.

The workload manager 208 determines a current processor core type based on information received from the core monitor 204 and determines a desired processor core type for the current policy by querying a workload allocator 306. The workload allocator 306 stores policy information associated with the current feature offerings, e.g., in a look-up table within memory. For example, a text feed from a friend may be associated in the workload allocator 306 with a relatively low-performance processor core. The workload manager 208 retrieves the desired processor core type from the workload allocator 306 for use in determining whether to increase/decrease the number/rate of tasks to schedule within the execution framework 308.

Figure 4:
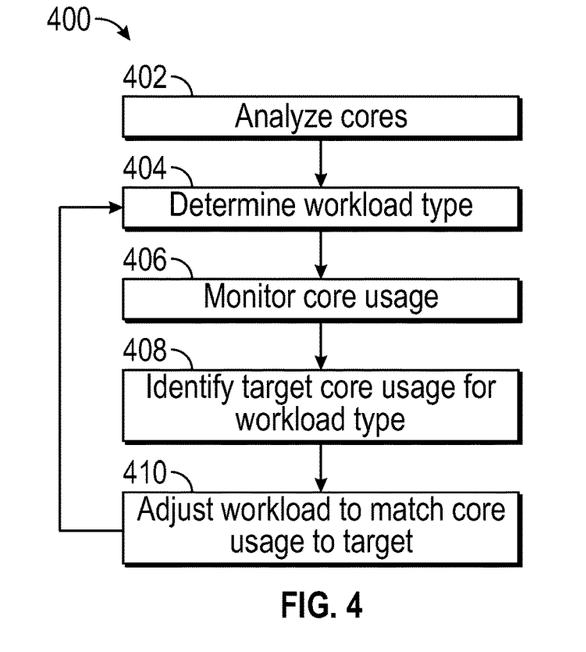
FIG. 4 is a flow diagram illustrating an example method for implementing processor core targeting.
Figure 5:
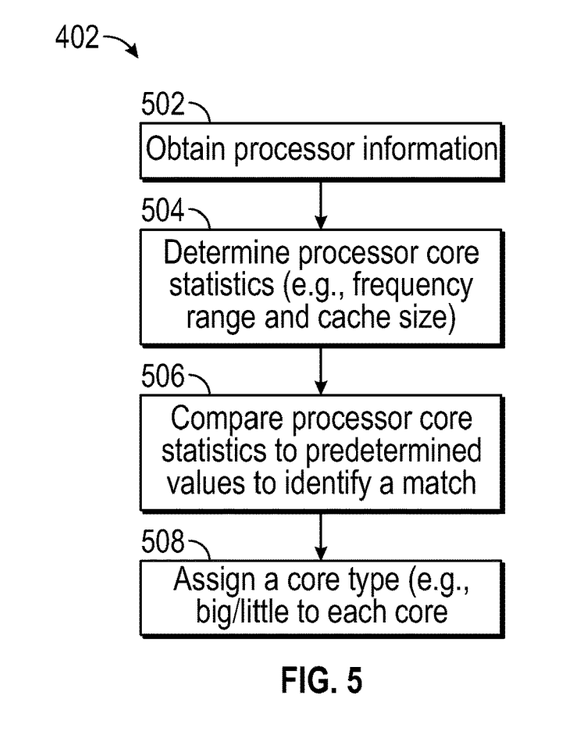
FIG. 5 is a flow diagram illustrating an example method for analyzing processor cores in the example method of FIG. 4.
Figure 6:
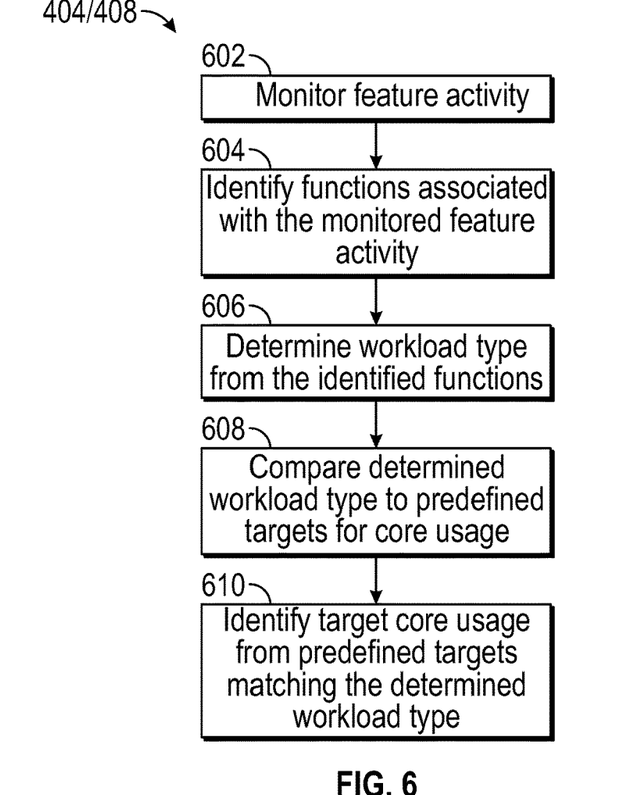
FIG. 6 is a flow diagram illustrating an example method for determining workload and identifying target processor core usage in the example method of FIG. 4.
Figure 7:
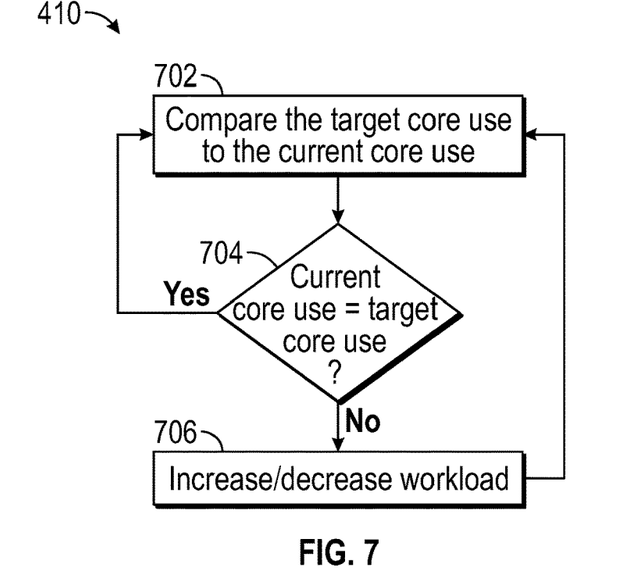
FIG. 7 is a flow diagram illustrating an example method for adjusting application workload to match core usage to the target core usage in the example method of FIG. 4.

FIG. 4 is a flow diagram illustrating an example method 400 for influencing processor core usage in a heterogeneous multiprocessor system, FIG. 5 is a flow diagram illustrating an example method 402 for analyzing processor cores in the processing block of FIG. 4, FIG. 6 is a flow diagram illustrating an example methods 404/408 for determining workload type and identifying target core usage in the processing blocks of FIG. 4, and FIG. 7 is a flow diagram illustrating an example method 410 for adjusting workload in the processing block of FIG. 4. Although the below description of the methods refers to the core target framework 116, other systems for monitoring and managing core usage based on application usage will be understood from the description herein. The flowcharts may describe the operations as a sequential process, however, many of the operations can be performed in parallel or concurrently. In addition, the order of the operations may be re-arranged. A process is terminated when its operations are completed. A process may correspond to a method, a procedure, etc. The steps of a method may be performed in whole or in part, may be performed in conjunction with some or all of the steps in other methods, and/or may be performed by any number of different systems, such as the systems described in FIGS. 1, 2, 3, and 8-10.

At block 402, the core monitor 204 analyzes the processor cores 304 of the heterogeneous multiprocessor system 302. The core monitor 204 may analyze the processor cores as illustrated in FIG. 5. The core monitor 204 obtains (block 502) processor information from the heterogeneous multiprocessor system 302 (block 502), e.g., by querying a CPU statistics directory generated by a Linux kernel running on the heterogeneous multiprocessor system. The core monitor 204 determines (block 504) processor core statistics (e.g., frequency range and cache size) from the obtained processor information. The core mapper 206 compares (block 506) the processor core statistics, which it receives from the core monitor 204, to predetermined values to identify a processor core type. The core mapper 206 assigns (block 508) a core type (e.g., big/little/adjustable) responsive to the identified match, e.g., by recording in a look-up table in memory accessible to the core monitor 204.

At block 404, the workload manager 208 determines a current workload type for an application (e.g., a social media application). The workload manager 208 may determine the current workload type as illustrated in blocks 602-606 of FIG. 6. The workload manager 208 monitors (block 602) feature activity. The workload manager 208 identifies the functions (block 604) associated with each activity. In one example, feature activity is determined based on the page the user of the application is currently viewing with each page providing different functions (e.g., text feed, video editing, video capturing, etc.) that need different levels of processing to render acceptable levels of performance to the user. The workload manager 208 determines (block 606) workload type from the determined feature activity using information stored in workload allocator 306. In one example, there are two workload types, a high-level processing type and a low-level processing type. In accordance with this example, feature activity involving a relatively high level of processing (e.g., video editing) is determined to be a high-level processing type and feature activity involving a relatively low level of processing (e.g., reading a text feed) is determined to be a low-level processing type.

At block 406, the core monitor 204 monitors core usage within the heterogeneous multiprocessor system 302. In one example, the core monitor 204 monitors which cores are currently processing instructions. The core monitor 204 may monitor which processor cores 304 are currently processing instructions by querying threads of instructions being performed by the heterogeneous multiprocessor system 302. In another example, where the processor cores are adjustable, the core monitor 204 monitors the current processing level of the processor cores 304.

At block 408, the workload manager 208 identifies a target processor core usage for the workload type determined at block 404. The workload manager 208 may determine the target processor core usage as illustrated in blocks 608-610 of FIG. 6. The workload manager 208 compares (block 608) the determined workload type as described above with reference to block 404 to predefined targets for processor core usage. The workload manager 208 then identifies (block 610) target core usage from predefined processor core targets (e.g., big or little) matching the determined workload type.

At block 410, the workload manager 208 adjusts the workload of the heterogeneous multiprocessor system 302 in order to match the actual processor core usage to the target processor core usage. The processing of blocks 404-410 may repeat periodically while the application is in use.

The workload manager 208 may adjust the workload as illustrated in FIG. 7. The workload manager 208 compares (block 702) a target processor core use (e.g., a subset of one or more processor cores associated with the target processor core use or a processing level of adjustable processor cores) to a current processor core use (e.g., a subset of one or more processor cores associated with the current processor core use or a processing level of adjustable processor cores). The workload manager 208 then determines (block 704) whether the current and target processor core(s) match. If the processor core(s) match, processing proceeds at block 702 with the workload manager 208 periodically comparing the current processor cores in the use to the target processor cores. If the processor core(s) do not match, processing proceeds at block 706, with the workload manager 208 adjusting the level of work (e.g., number of threads being scheduled) in order to influence which core(s) the heterogeneous multiprocessor system 302 is using for processing. For example, if the current processor core(s) 304 in use is a relatively high-performance core ("Big") and the target/desired core(s) 304 is a relatively low-performance core ("Little"), the workload manager 208 will reduce the number/rate of tasks being assigned to the task queues 310 in order to have the heterogeneous multiprocessor system 302 move processing to the relatively low-performance core 304 or, in the case of adjustable processors, transition to a relatively low performance level. On the other hand, if the current core(s) 304 in use is a relatively low-performance core ("Little") and the desired core(s) 304 is a relatively high-performance core 304 ("Big"), the workload manager will increase the number/rate of tasks being assigned to the task queues 310 in order to have the heterogeneous multiprocessor system 302 move processing to the relatively high-performance core(s) 304 or, in the case of adjustable processors, transition to a relatively high performance level.

Figure 8:
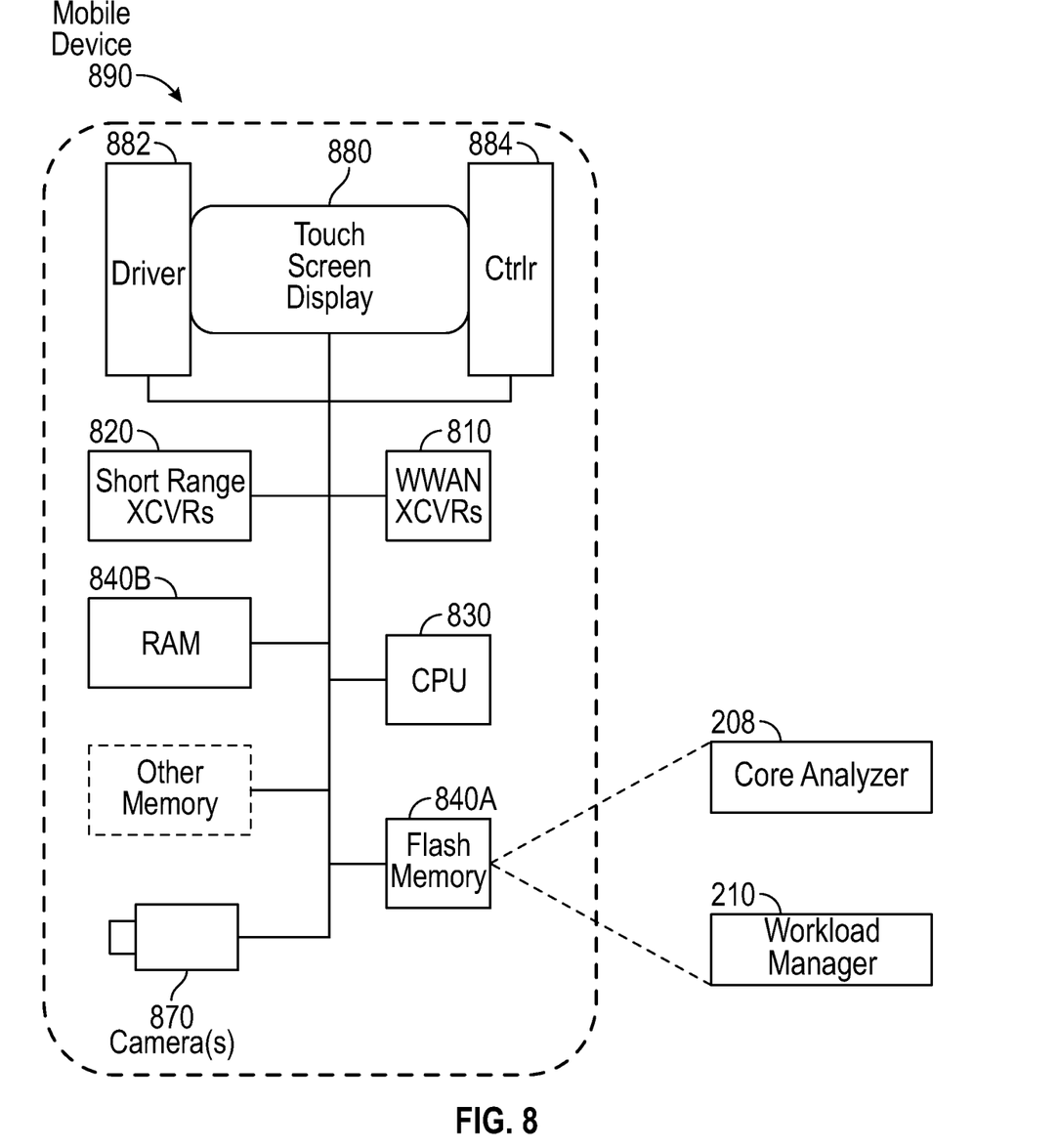
FIG. 8 is a diagrammatic representation of an example hardware configuration for a client device embodied as a mobile device.

FIG. 8 is a high-level functional block diagram of an example client device 110 embodied as an example mobile device 890 that includes the core analyzer 208 and the workload manager 210. The mobile device 890 includes a flash memory 840A which includes programming to perform all or a subset of the functions described herein for the core analyzer 208 and the workload manager 210. The mobile device 890 can include a camera 870 that comprises at least two visible light cameras (first and second visible light cameras with overlapping fields of view) or at least on visible light camera and a depth sensor with substantially overlapping fields of view. A memory 840A may further include multiple images or video, which are generated via the camera 870.

As shown, the mobile device 890 includes an image display 880, an image display driver 882 to control the image display 880, and a controller 884. In the example of FIG. 8, the image display 880 and a user input device are integrated together into a touch screen display.

Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 8 therefore provides block diagram illustrations of the example mobile device 890 having a touch screen display for displaying content and receiving user input as (or as part of) the user interface.

As shown in FIG. 8, the mobile device 890 includes at least one digital transceiver (XCVR) 810, shown as WWAN XCVRs, for digital wireless communications via a wide area wireless mobile communication network. The mobile device 890 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 890, the mobile device 890 can include a global positioning system (GPS) receiver. Alternatively, or additionally, the mobile device 890 can utilize either or both the short range XCVRs 820 and WWAN XCVRs 810 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 810, 820.

The transceivers 810, 820 (network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web related inputs, and various types of mobile message communications to/from the mobile device 890.

The mobile device 890 further includes a microprocessor, shown as CPU 830, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 830, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 830 or processor hardware in smartphone, laptop computer, and tablet.

The microprocessor 830 serves as a programmable host controller for the mobile device 890 by configuring the mobile device 890 to perform various operations, for example, in accordance with instructions or programming executable by processor 830. For example, such operations may include various general operations of the mobile device, as well as operations related to the programming for the core analyzer 208 and the workload manager 210. Although a processor may be configured by use of hardwired logic, typical processors in mobile devices are general processing circuits configured by execution of programming.

The mobile device 890 includes a memory or storage device system, for storing data and programming. In the example, the memory system may include a flash memory 840A and a random access memory (RAM) 840B. The RAM 840B serves as short term storage for instructions and data being handled by the processor 830, e.g., as a working data processing memory. The flash memory 840A typically provides longer term storage.

Hence, in the example of mobile device 890, the flash memory 840A is used to store programming or instructions for execution by the processor 830. Depending on the type of device, the mobile device 890 stores and runs a mobile operating system through which specific applications, including programming for the core analyzer 208 and the workload manager 210 are executed. Applications, such as programming for the core analyzer 208 and the workload manager 210, may be a native application, a hybrid application, or a web application (e.g., a dynamic web page executed by a web browser) that runs on mobile device 890. Examples of mobile operating systems include Google Android, Apple iOS (I-Phone or iPad devices), Windows Mobile, Amazon Fire OS, RIM BlackBerry operating system, or the like.

Figure 9:
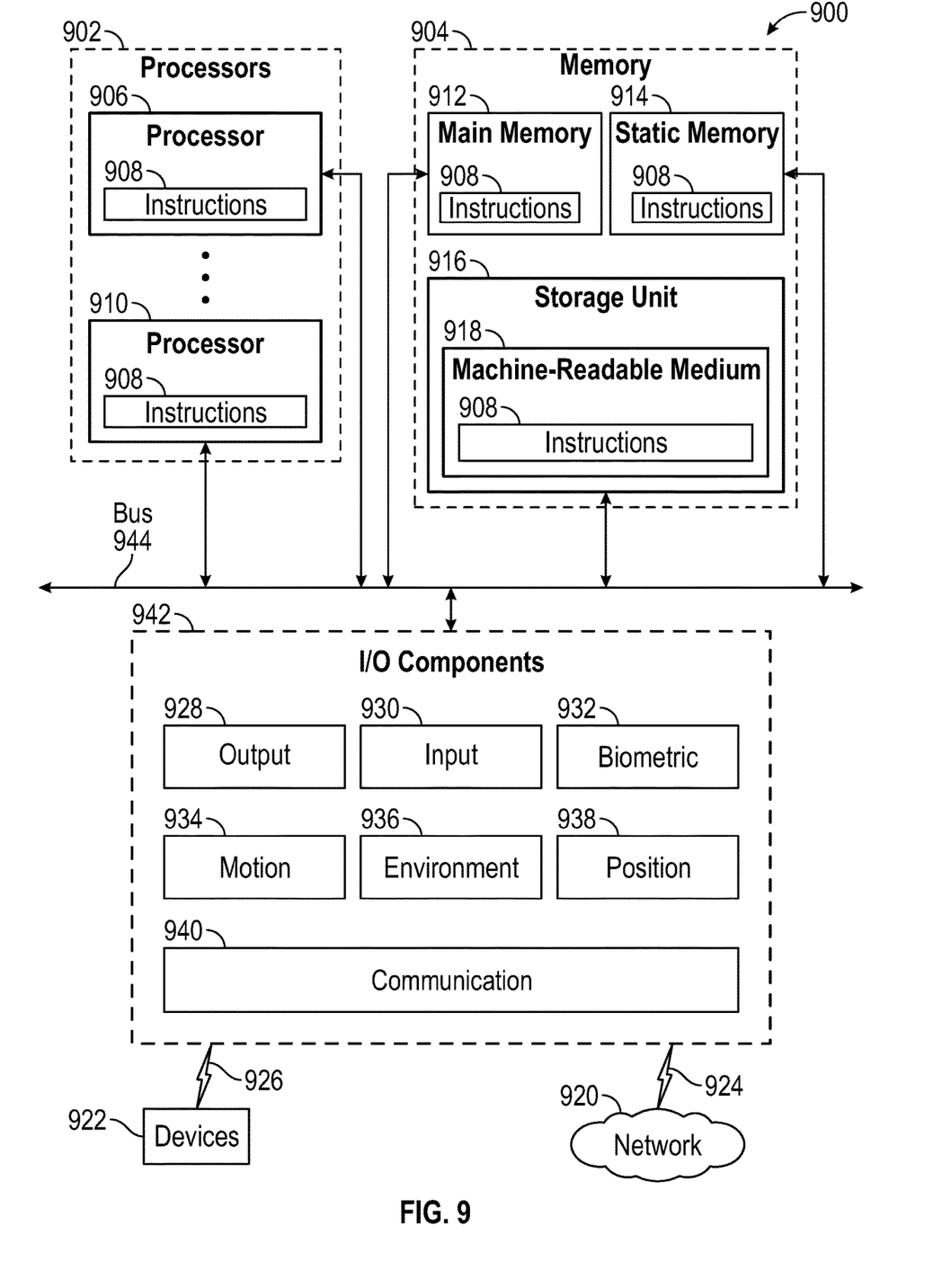
FIG. 9 is a diagrammatic representation of a machine in the form of a computer system within which a set of instructions may be executed for causing the machine to perform any one or more of the methodologies described herein, in accordance with some examples.

FIG. 9 is a diagrammatic representation of a machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment.

The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include heterogeneous multiprocessor systems that may comprise two or more independent processors (sometimes referred to as "cores") that may execute instructions contemporaneously. Although FIG. 9 shows multiple processors 902, the machine 900 may include a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902, and storage unit 916) may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 10:
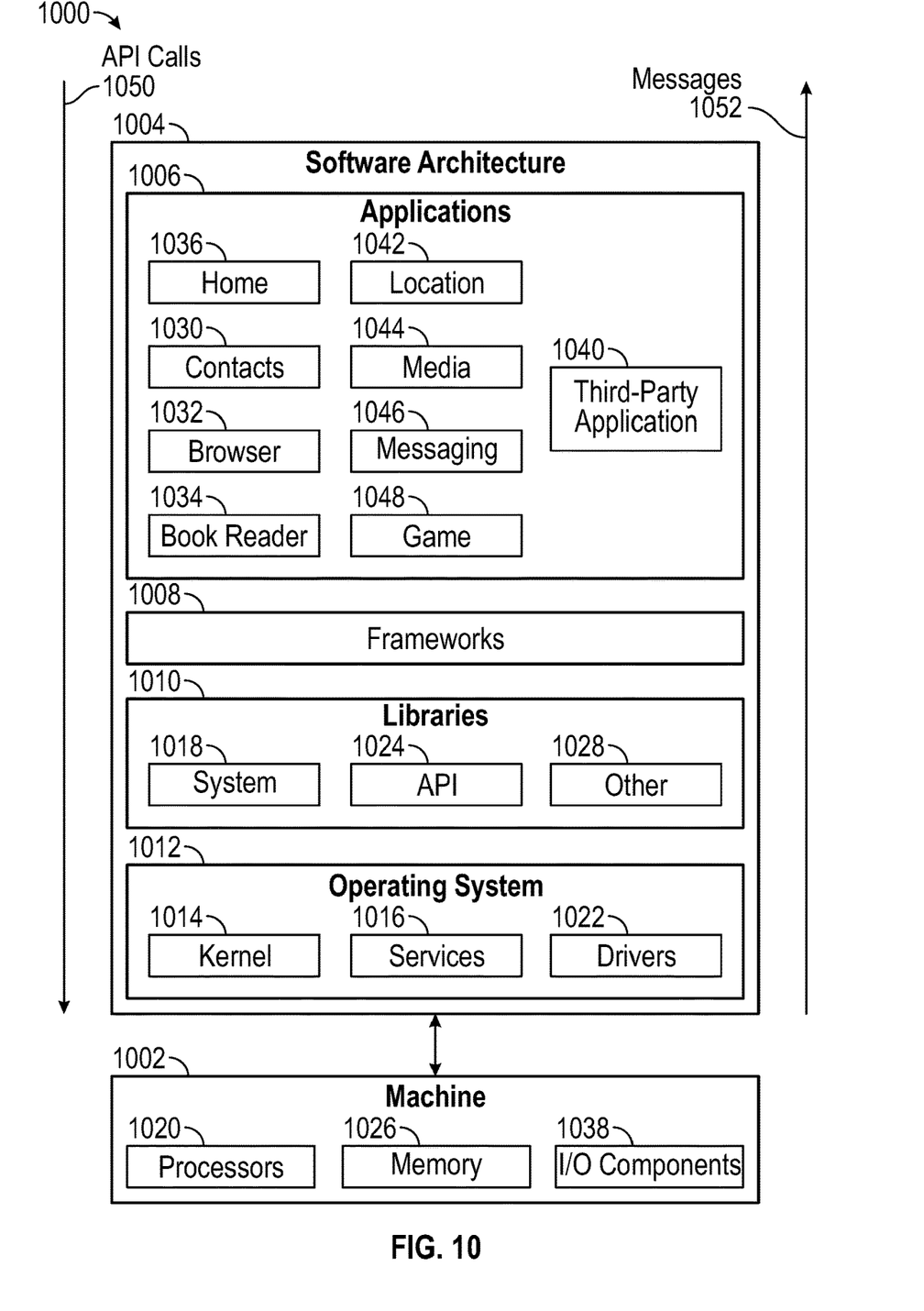
FIG. 10 is block diagram showing a software architecture within which aspects of the present disclosure may be implemented, in accordance with some examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g. approximate, substantially or about), may vary by as much as ±10% from the recited amount.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. A method for influencing processor core usage in a heterogeneous multiprocessor system of a device, the method comprising:
    determining a workload type for an application running on the heterogeneous multiprocessor system of the device;
    monitoring the heterogeneous multiprocessor system core usage to identify a first subset of one or more processor cores within the heterogeneous multiprocessor system performing the workload type;
    identifying a target processor core usage for the workload type, the target processor core usage including a second subset of one or more processor cores within the heterogeneous multiprocessor system; and
    adjusting a workload of the application to transition from a performance level of the first subset of one or more processor cores to a performance level of the second subset of one or more processor cores.

2. The method of claim 1, wherein the workload type is a first workload type, the target processor core usage is a second target processor core usage, and the method further comprises:
    determining a second workload type for the application running on the heterogeneous multiprocessor system of the device; and
    identifying a second target processor core usage for the workload type, the second target processor core usage including a third subset of one or more cores within the heterogeneous multiprocessor system that is different than the second subset of one or more processor cores;
    wherein the adjusting comprises adjusting the workload of the application to transition from a performance level of the third subset of one or more processor cores to a performance level of the second subset of one or more processor cores.

3. The method of claim 1, further comprising:
analyzing the heterogeneous multiprocessor system to identify one or more high-level processor cores having a relatively high level of performance and one or more low-level processor cores having a relatively low level of performance with respect the one or more high-level processor cores.

4. The method of claim 3, wherein the analyzing comprises:
determining processor core statistics for each of a plurality of the processor cores;
comparing the processor core statistics for each of the processor cores to known values for high-level processor cores and low-level processor cores to identify a match; and
assigning a processor core type to each of the processor cores of the heterogeneous multiprocessor system responsive to the identified match.

5. The method of claim 4, wherein the processor core statistics include at least one of frequency range or cache size.

6. The method of claim 1, wherein determining the workload type comprises:
monitoring feature activity within the application to identify one or more functions associated with the feature activity; and
determining workload type corresponding to the one or more identified functions.

7. The method of claim 6, wherein identifying the target processor core usage comprises:
comparing the determined workload type to predefined targets for processor core usage; and
identifying the target processor core usage from the predefined targets by selecting one of the predetermined targets that matches the determined workload type.

8. The method of claim 1, wherein adjusting the workload of the application comprises:
comparing the performance level of the second subset of processor cores to the performance level of the first subset of processor cores; and
adjusting the workload of the application if the performance level of the second subset of processor cores is different than the performance level of the first subset of processor cores.

9. The method of claim 8, wherein the adjusting comprises:
increasing the workload if the second subset of processor cores are relatively high-performance processor cores as compared to the first subset of processor cores; and
decreasing the workload if the second subset of processor cores are relatively low-performance processor cores as compared to the first subset of processor cores.

10. A system for influencing processor core usage in a heterogeneous multiprocessor system of a device, the system comprising:
a memory that stores instructions; and
a heterogeneous multiprocessor system configured by the instructions to perform operations comprising:
determining a workload type for an application running on the heterogeneous multiprocessor system of the device;
monitoring the heterogeneous multiprocessor system core usage to identify a first subset of one or more processor cores within the heterogeneous multiprocessor system performing the workload type;
identifying a target processor core usage for the workload type, the target processor core usage including a second subset of one or more processor cores within the heterogeneous multiprocessor system; and
adjusting a workload of the application to transition from a performance level of the first subset of one or more processor cores to a performance level of the second subset of one or more processor cores.

11. The system of claim 10, wherein the workload type is a first workload type, the target processor core usage is a second target processor core usage, and the system further comprises the heterogeneous multiprocessor system being configured by the instructions to perform additional operations comprising:
determining a second workload type for the application running on the heterogeneous multiprocessor system of the device; and
identifying a second target processor core usage for the workload type, the second target processor core usage including a third subset of one or more processor cores within the heterogeneous multiprocessor system that is different than the second subset of one or more processor cores;
wherein the adjusting comprises adjusting the workload of the application to transition from a performance level of the third subset of one or more processor cores to a performance level of the second subset of one or more processor cores.

12. The system of claim 10, further comprising:
a core analyzer configured to analyze the heterogeneous multiprocessor system to identify one or more high-level processor cores having a relatively high level of performance and one or more low-level processor cores having a relatively low level of performance with respect the one or more high-level processor cores.

13. The system of claim 12, wherein the analyzing comprises:
determining processor core statistics for each of a plurality of the processor cores;
comparing the processor core statistics for each of the processor cores to known values for high-level processor cores and low-level processor cores to identify a match; and
assigning a processor core type to each of the processor cores of the heterogeneous multiprocessor system responsive to the identified match.

14. The system of claim 13, wherein the processor core statistics include at least one of frequency range or cache size.

15. The system of claim 10, wherein determining the workload type comprises:
monitoring feature activity within application to identify one or more functions associated with the feature activity; and
determining workload type corresponding to the one or more identified functions.

16. The system of claim 15, wherein identifying the target processor core usage comprises:
comparing the determined workload type to predefined targets for processor core usage; and
identifying the target processor core usage from the predefined targets by selecting one of the predetermined targets that matches the determined workload type.

17. The system of claim 10, wherein adjusting the workload of the application comprises:

comparing the performance level of the second subset of processor cores to the performance level of the first subset of processor cores; and adjusting the workload of the application if the performance level of the second subset of processor cores is different than the performance level of the first subset of processor cores.

18. The system of claim 17, wherein the adjusting comprises:

increasing the workload if the second subset of processor cores are relatively high-performance processor cores as compared to the first subset of processor cores; and decreasing the workload if the second subset of processor cores are relatively low-performance processor cores as compared to the first subset of processor cores.

19. A non-transitory processor-readable storage medium storing processor-executable instructions for influencing processor core usage in a heterogeneous multiprocessor system of a device that, when executed by a processor of a machine, cause the machine to perform operations comprising:

determining a workload type for an application running on the heterogeneous multiprocessor system of the device;

monitoring the heterogeneous multiprocessor system core usage to identify a first subset of one or more processor cores within the heterogeneous multiprocessor system performing the workload type;

identifying a target processor core usage for the workload type, the target processor core usage including a second subset of one or more processor cores within the heterogeneous multiprocessor system; and adjusting a workload of the application to transition from a performance level of match the first subset of one or more processor cores to a performance level of the second subset of one or more processor cores.

20. The non-transitory processor-readable storage medium of claim 19, wherein the workload type is a first workload type, the target processor core usage is a second target processor core usage, and the stored instructions further cause the machine to perform operations comprising:

determining a second workload type for the application running on the heterogeneous multiprocessor system of the device; and identifying a second target processor core usage for the workload type, the target processor core usage including a third subset of one or more processor cores within the heterogeneous multiprocessor system that is different than the second subset of one or more processor cores;

wherein the adjusting comprises adjusting the workload of the application to transition from a performance level of the third subset of one or more processor cores to a performance level of the second subset of one or more processor cores.

\* \* \* \* \*